US007678981B2

(12) United States Patent
Toyama

(10) Patent No.: US 7,678,981 B2
(45) Date of Patent: Mar. 16, 2010

(54) KEYBOARD STRUCTURE OF ELECTRONIC KEYBOARD INSTRUMENT

(75) Inventor: Yutaka Toyama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 11/827,785

(22) Filed: Jul. 13, 2007

(65) Prior Publication Data

US 2008/0017016 A1 Jan. 24, 2008

(30) Foreign Application Priority Data

Jul. 18, 2006 (JP) ............................. 2006-196011

(51) Int. Cl.
*G01C 3/12* (2006.01)

(52) U.S. Cl. ....................................... 84/439; 84/423 R

(58) Field of Classification Search ................... 84/439, 84/423 R

See application file for complete search history.

(56) References Cited

U.S. PATENT DOCUMENTS 4,914,999 A * 4/1990 Masubuchi et al. ....... 84/423 R
5,821,443 A 10/1998 Masubuchi et al.
5,895,875 A 4/1999 Osuga et al.

FOREIGN PATENT DOCUMENTS

JP 2628656 4/1997
JP 2001-125573 5/2001
JP 2001-296868 10/2001
JP 2002-369904 12/2002
JP 2004-117528 4/2004
JP 2005-189511 7/2005
JP 2007-163526 6/2007

* cited by examiner

*Primary Examiner*—Jianchun Qin
(74) *Attorney, Agent, or Firm*—Morrison & Foerster LLP

(57) ABSTRACT

A keyboard structure capable of suppressing a depth dimension of a keyboard instrument and rearward displacements of key main bodies to thereby prevent plastic deformation of hinges. White and black key main bodies are each disposed for pivotal motion around a common base end, serving as a key fulcrum, in a key depression/release direction via a hinge extended therefrom vertically downward. A rear stopper is provided in an intermediate portion of a key frame, and a contact portion of a stopper contact member is in light contact with a front surface of the rear stopper when a key main body is in a key depression initial position. In a key-nondepressed state, when a rearwardly force is applied to a key main body, the rear stopper applies the contact portion with a forwardly force against the rearwardly force, thus suppressing a rearward displacement of the key main body.

7 Claims, 8 Drawing Sheets

KEYBOARD STRUCTURE OF ELECTRONIC KEYBOARD INSTRUMENT

CROSS-REFERENCE TO RELATED APPLICATIONS

This application is related to and claims priority from Japanese Patent Application No. 2006-196011, filed Jul. 18, 2006, the contents of which are hereby incorporated herein by reference in their entirety.

BACKGROUND OF THE INVENTION

1. Field of the Invention

The present invention relates to a keyboard structure of an electronic keyboard instrument, which is provided with keys whose main bodies are connected via thin plate-like hinges to base ends of these keys for pivotal motion about the base ends as key fulcrums in a key depression/release direction.

2. Description of the Related Art

A keyboard structure of an electronic keyboard instrument has conventionally been known, in which key main bodies are supported for pivotal motion via thin plate-like hinges by base ends at the rear of keys (Japanese Patent Publication No. 2628656). In the keyboard structure of this type, the hinges are horizontally rearwardly extended in substantially parallel to key depression surfaces of the keys, and thus the keys are long in longitudinal dimension. As a result, the keyboard instrument and its instrument body are long in depth.

On the other hand, Japanese Laid-open Patent Publication No. 2001-215968 discloses a keyboard structure in which hinges and base ends are extended perpendicularly downward from the rear of key main bodies, whereby the longitudinal dimension of keys is shortened.

However, in the keyboard structure disclosed in Japanese Laid-open Patent Publication No. 2001-215968, the hinges are extended parallel to the vertical direction and adapted to be deformed in the front-to-rear direction. When a force from front to rear is applied to any of the key main bodies, a corresponding hinge receives substantially the entirety of the force, and the hinge is deformed rearward. Such a force from front to rear can be generated when a key front end is simply depressed with a finger. In some cases, the key depressing force can be strong. Therefore, there is a fear that a hinge can be plastic-deformed due to an excessive force being applied thereto carelessly.

In a case where hinges are designed to be adequately long in length, the hinges are hardly plastic-deformed when applied with a force from front to rear. When the hinges are made excessively long, however, the key main bodies are likely to make rolling motion. In that case, the performance of keys are remarkably deteriorated, which is disadvantageous.

SUMMARY OF THE INVENTION

The present invention provides a keyboard structure of an electronic keyboard instrument, which is capable of suppressing the depth size of the keyboard instrument and rearward displacements of key main bodies in a key-nondepressed state, thereby making it possible to prevent plastic deformation of hinges.

According to the present invention, there is provided a keyboard structure of an electronic keyboard instrument, comprising keys having key main bodies thereof connected through thin plate-like hinges to base ends at a rear of the keys and adapted to be pivoted about the base ends as key fulcrums in a key depression/release direction, a key frame fixedly provided relative to an instrument body and adapted to fixedly support the base ends of the keys, a stopper fixedly provided in at least one of the instrument body and the key frame, and stopper contact portions provided in the key main bodies and disposed close to or in contact with the stopper in a key-nondepressed state, wherein the hinges of the keys are formed to extend in a direction to cross key depression surfaces of the key main bodies and parallel to a key arrangement direction, and wherein when any of the key main bodies is urged rearward at least in the key-nondepressed state, the stopper contact portion corresponding to the urged key main body is made in contact with the stopper to thereby restrict a rearward displacement of the urged key main body.

According to the present invention, it is possible to reduce the depth dimension of the keyboard instrument and suppress rearward displacements of the key main bodies in a key-nondepressed state to thereby prevent hinges from being plastic-deformed.

In the keyboard structure, a distance between the stopper and each of the stopper contact portions during a key depression/release stroke can be made minimum in the key-nondepressed state.

In that case, it is possible to set the distance between the stopper and the stopper contact portions in the key-nondepressed state to be minimum or zero without hindering a key depression operation, to thereby suppressing rearward displacements of the key main bodies in the key-nondepressed state to a minimum to effectively prevent plastic deformation of the hinges.

In the keyboard structure, the base ends can be located below the key depression surfaces of the key main bodies in the key-nondepressed state, and the stopper contact portions can each be adapted to be displaced forwardly together with a corresponding one of the key main bodies with a forward pivotal motion of the key main body in a key depression stroke, so that a distance between the stopper and the stopper contact portion in a front-to-rear direction increases with the forward pivotal motion of the key main body during the key depression stroke.

In that case, the key main body is forwardly displaced upon key depression, whereby the locus of a key depression point can be made more preferable for music performance and a plastic deformation of the hinge concerned can effectively be prevented without hindering a key-depression operation.

In the keyboard structure, the stopper can be provided in the key frame and formed to have a function of a key guide to guide a key depression/release action of the key main bodies.

In that case, the stopper serving also as a key guide can suppress rearward displacements of the key main bodies without the need of a complicated structure.

In the keyboard structure, the stopper can be provided in the key frame and formed to have a function of a key depression initial stopper adapted for contact with the key main body reversely pivoted in the key depression stroke to thereby restrict a key depression initial position of the keys.

In that case, the stopper serving also as the key depression initial stopper can suppress rearward displacements of the key main bodies without the need of a complicated structure.

In the keyboard structure, the stopper can be provided in the key frame and formed to have a function of a key depression end stopper adapted for contact with the key main body forwardly pivoted in the key depression stroke to thereby restrict a key depression end position of the keys.

In that case, the stopper serving also as the key depression end stopper can suppress rearward displacements of the key main bodies without the need of a complicated structure.

Further features of the present invention will become apparent from the following description of exemplary embodiments with reference to the attached drawings.

DETAILED DESCRIPTION OF THE PREFERRED EMBODIMENTS

The present invention will now be described in detail below with reference to the drawings showing preferred embodiments thereof.

First Embodiment

Figure 1:
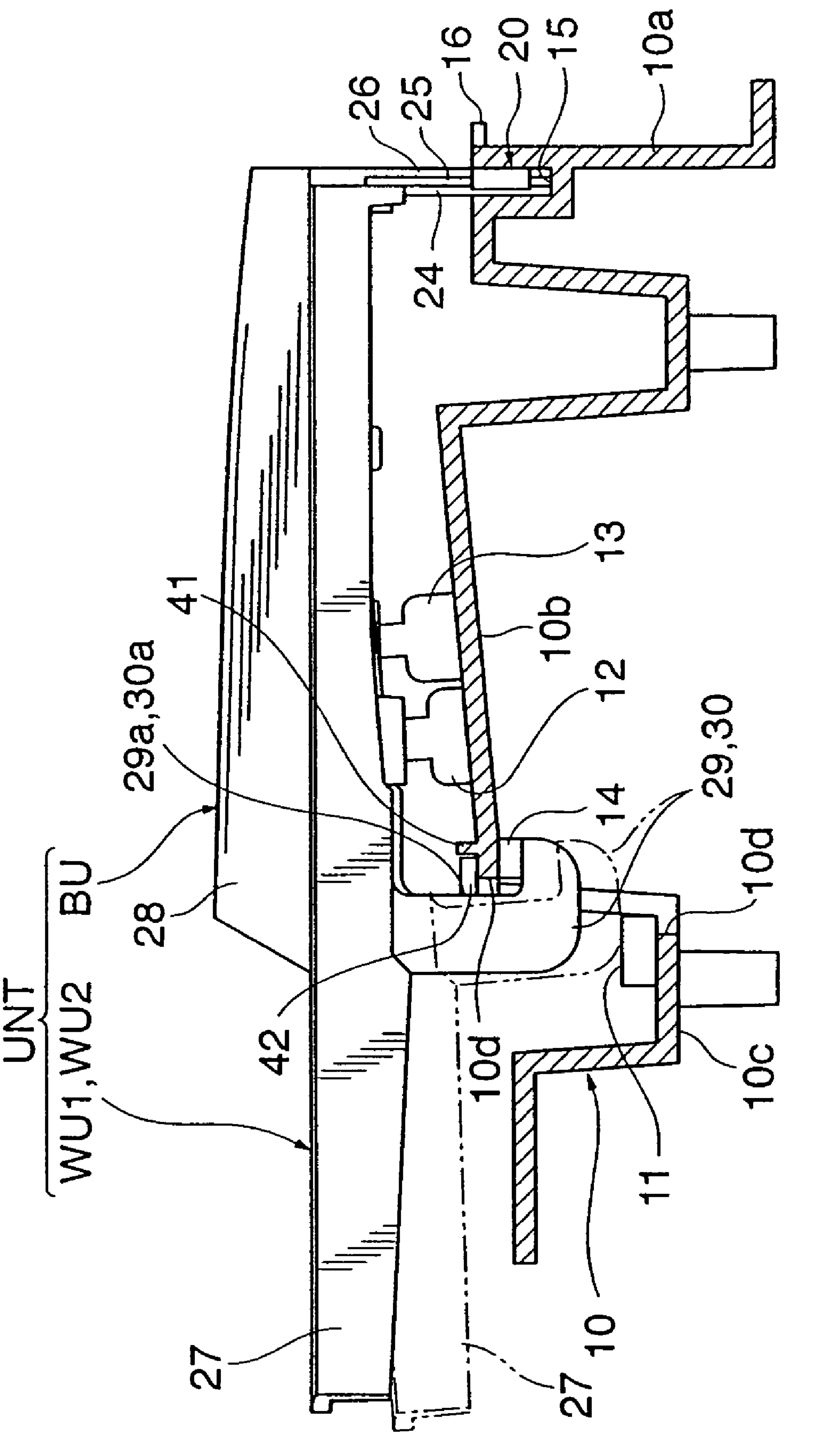
FIG. 1 is a sectional view showing an essential part of an electronic keyboard instrument to which is applied a keyboard structure according to a first embodiment of the present invention.

FIG. 1 is a sectional view showing an essential part of an electronic keyboard instrument to which is applied a keyboard structure according to a first embodiment of the present invention. This keyboard instrument includes a key frame 10 mounted with a key unit UNT. In the following, a side of the keyboard instrument toward a player (the left side in FIG. 1) will be referred to as the front side, and the left-to-right direction will be determined in reference to the player. It should be noted that an illustration of an instrument body that supports the key frame 10 is omitted.

Figure 2A:
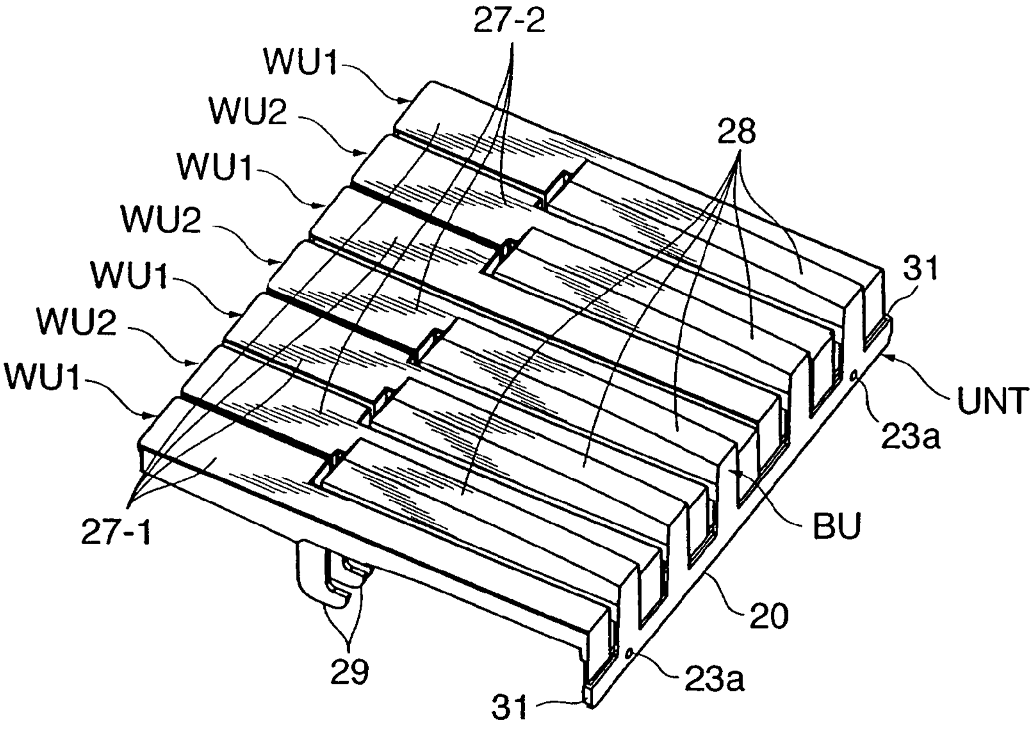
FIG. 2A is a perspective view of a key unit.
Figure 2B:
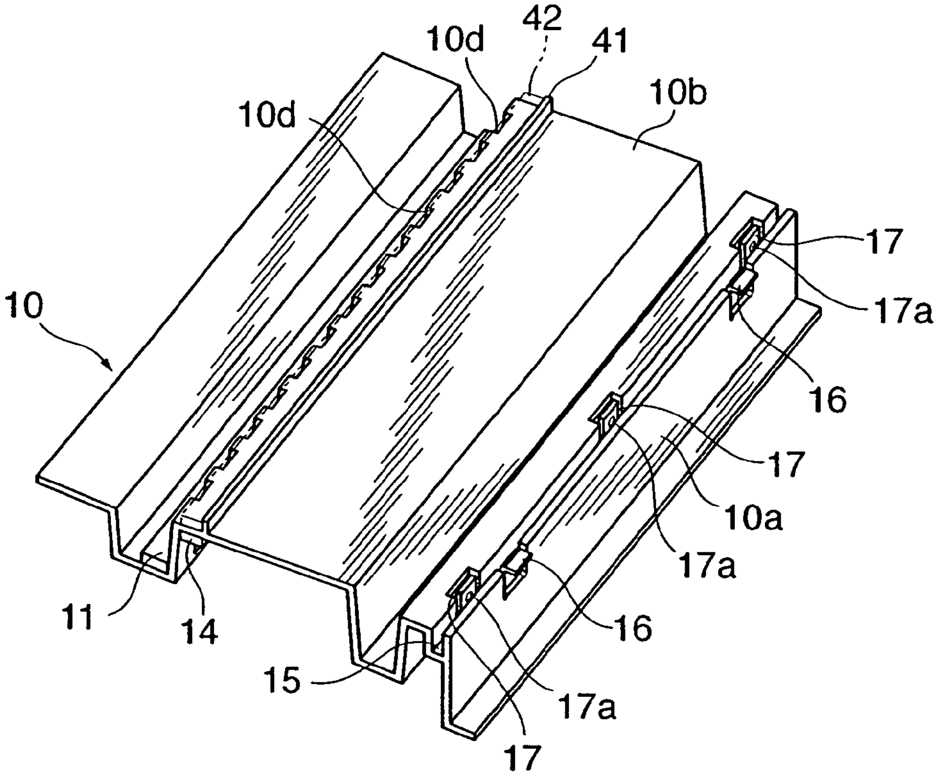
FIG. 2B is a perspective view of a key frame.

FIG. 2A is a perspective view of the key unit UNT, and FIG. 2B is a perspective view of the key frame 10. As shown in FIG. 2A, the key unit UNT is constructed on an octave basis, for instance, to have one or more one-octave parts and includes first and second white key units WU1, WU2 each having a plurality of white key main bodies 27 and a black key unit BU having a plurality of black key main bodies 28, these three units being assembled in a stacked relation. The key frame 10 is formed by resin into one piece or by a composite of resin and non-resin (metal or the like), and extends over the entire width of all keys. In FIG. 2B, only one-octave part of the key frame 10 is shown.

As shown in FIGS. 1 and 2B, at a lower part of a front portion 10*c* of the key frame 10, there is provided a key depression stopper 11 adapted to restrict lower limit positions (key depression end positions) of the white and black key main bodies 27, 28 at the time of key depression. At a lower front part of a nearly flat intermediate portion 10*b* of the key frame 10 disposed at an intermediate position in the front-to-rear direction, an upper limit stopper 14 is provided for restricting upper limit positions (key depression initial positions) of the white and black key main bodies at the time of key release, i.e., in a key-nondepressed state. The lower and upper stoppers 11, 14 are each formed by an elastic material such as felt.

At an upper front part of the intermediate portion 10*b*, there is integrally formed a ridge-like protrusion 41 in the key arrangement direction, and a rear stopper 42 is fixedly provided by, for example, being fixed so as to be in contact with a front surface of the ridge-like protrusion 41. As will be described later, the rear stopper 42 acts to restrict rearward displacements of the white and black key main bodies 27, 28, which are in a key-nondepressed state. The intermediate portion 10*b* of the key frame 10 is formed at its front end with notches 10*d* respectively corresponding to the white and black key main bodies 27, 28.

As shown in FIG. 1, at the intermediate portion 10*b* of the key frame 10, there are disposed two-make-contact key depression switches 12, 13, which respectively correspond to the white and black key main bodies 27, 28. It should be noted that FIG. 2B omits illustrations of mounting portions of the key frame 10 to which the key depression switches 12, 13 are mounted. The key frame 10 has its rear portion 10*a* formed with a recessed groove 15 over the entire key width, which fittedly supports a common-to-all-keys base end 20 (a base end common to all the keys) of the key unit UNT. The recessed groove 15 is a substantially U-shape as seen from side and has an opening that opens upward.

Figure 3:
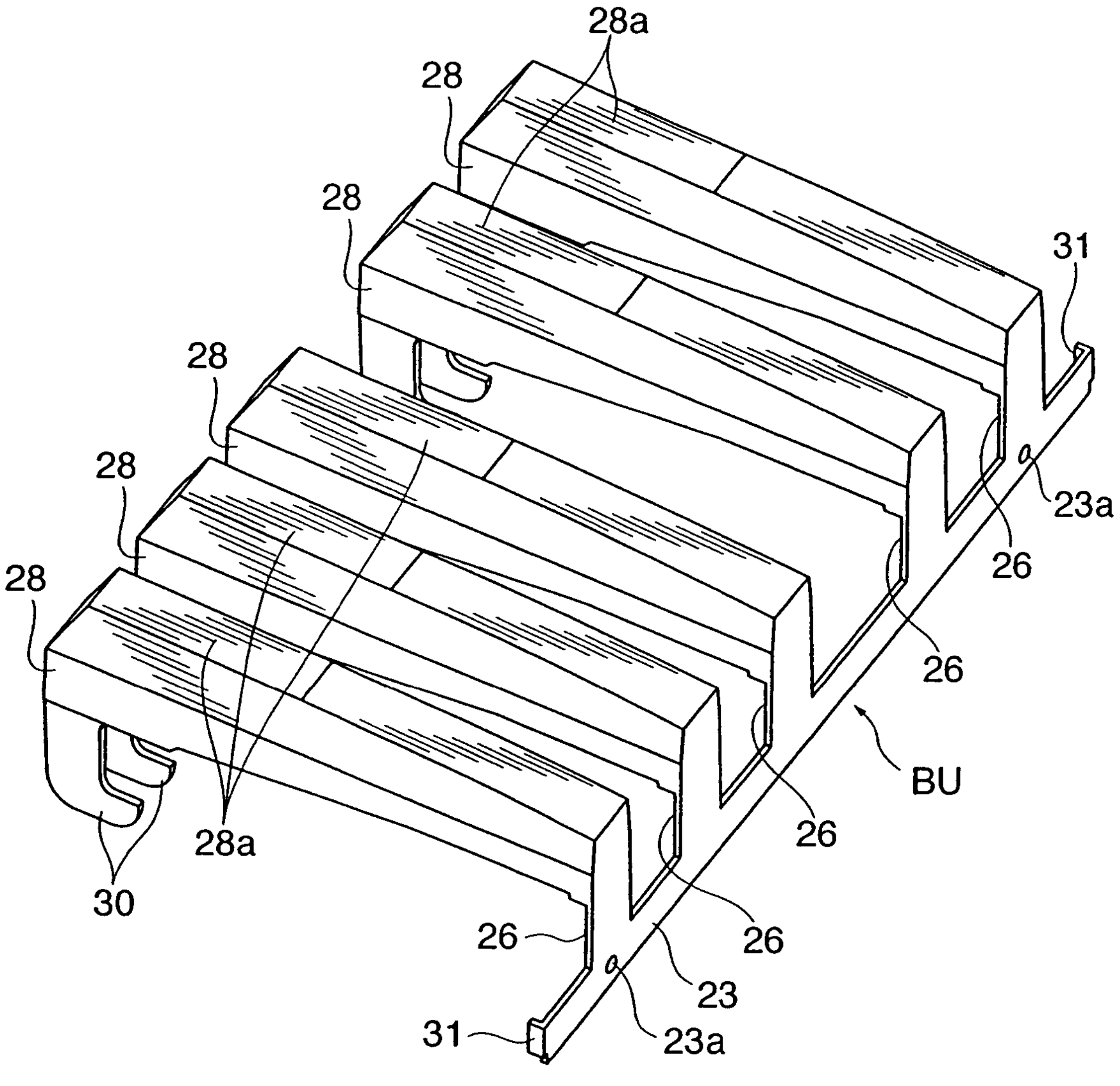
FIG. 3 is a perspective view of a black key unit.
Figure 4:
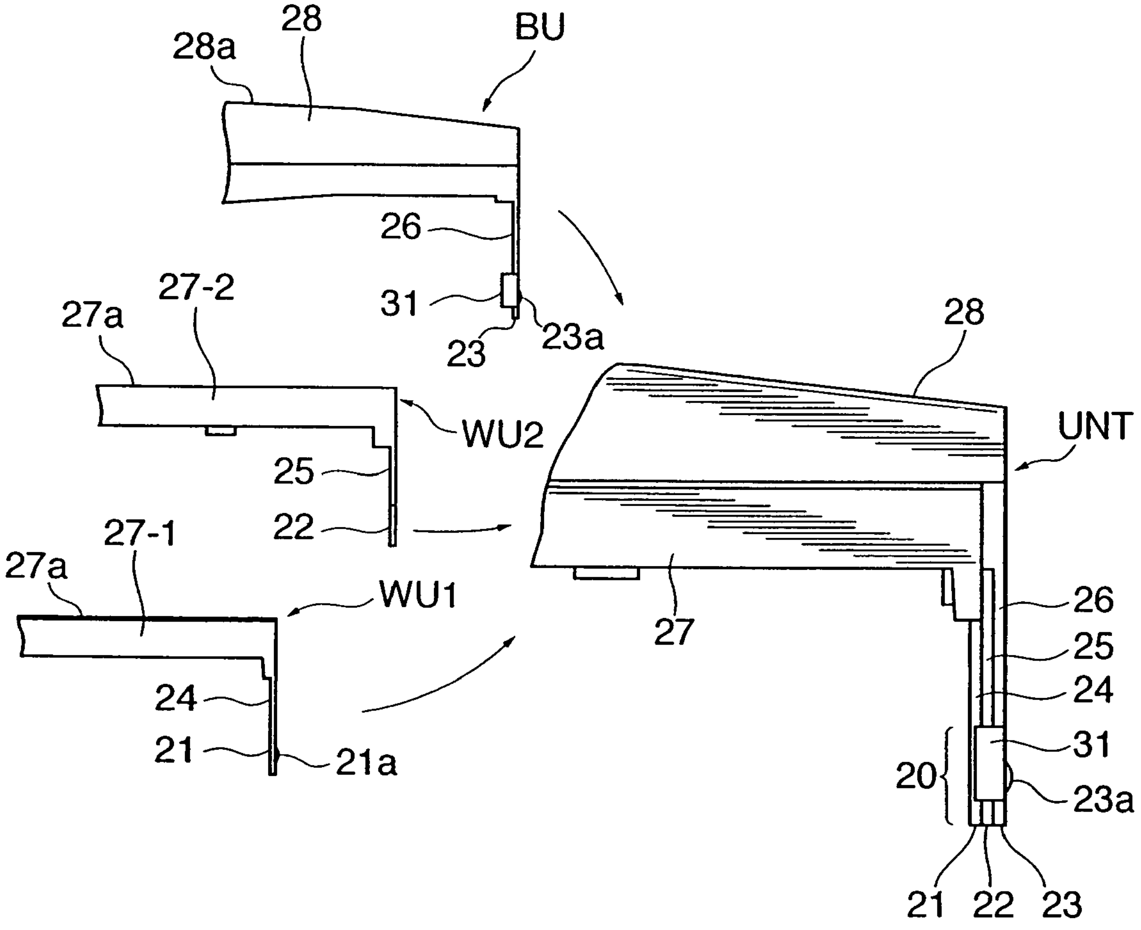
FIG. 4 is a side view showing rear halves of white key units, the black key unit, and the key unit.

FIG. 3 is a perspective view of the black key unit BU, and FIG. 4 is a side view showing rear halves of the white key units WU1, WU2, the black key unit BU, and the key unit UNT.

As shown in FIGS. 2A, 3 and 4, the black key unit BU includes black key main bodies 28 respectively corresponding to tone pitches C#, D#, F#, G#, and A#. As shown in FIGS. 2A and 4, the first white key unit WU1 includes white key main bodies 27-1 corresponding to tone pitches C, E, G, and B, and the second white key unit WU2 includes white key main bodies 27-2 corresponding to tone pitches D, F, and A. In the following, the white key main bodies 27-1, 27-2 are simply referred to as "white key main bodies 27" when they are referred to without distinction. The white and black key main bodies 27, 28 have front haves whose upper surfaces function as key depression surfaces 27*a*, 28*a*. The white key units WU1, WU2 and the black key unit BU are made of resin and constructed by integral forming.

As shown in FIGS. 1 to 3, the white and black key main bodies 27, 28 each have a front portion formed with a stopper contact member 29 or 30 extending downward for contact with the key depression stopper 11 at the time of key depression. The stopper contact members 29, 30 have lower portions thereof provided with rearwardly extended parts each of which is adapted to be inserted into a corresponding one of the notches 10*d* in the intermediate portion 10*b* of the key frame 10 (refer to FIGS. 1 and 2B).

As shown in FIGS. 3 and 4, thin plate-like hinges 26 are extended downward from rear ends of the black key main bodies 28 of the black key unit BU. These hinges 26 are connected at their lower ends to a common-to-black-keys base end 23 (a base end common to the black keys) having a length corresponding to one octave. The hinges 26 and the common-to-black-keys base end 23 are the same in thickness and extend in a vertical direction and in parallel to the key arrangement direction (the left-to-right direction). The black key main bodies 28 are supported via the hinges 26 for pivotal motion relative to the common-to-black-keys base end 23, serving as a key fulcrum, in the vertical direction (in the key depression/release direction). The common-to-black-keys base end 23 is formed at its left and right ends with temporary joint members 31 that prevent the assembled key unit UNT from being disassembled in the left-to-right direction. Each temporary joint member 31 is formed into a plate-like shape and extended forward from the left or right end of the common-to-black-keys base end 23.

As shown in FIG. 4 and as in the case of the black key unit BU, hinges 24 are extended downward from rear ends of the white key main bodies 27-1 of the first white key unit WU1. The hinges 24 are connected at lower ends thereof to a first common-to-white-keys base end 21 (a base end common to white keys corresponding to tone pitches C, E, G, and B). Hinges 25 are extended downward from rear ends of the white key main bodies 27-2 of the second white key unit WU2. The hinges 25 are connected at lower ends to a second common-to-white-keys base end 22 (a base end common to white keys corresponding to tone pitches D, F, and A). Each white key main body 27 is supported via a corresponding hinge 24 or 25, serving as a key fulcrum, for vertically pivotal motion relative to the first or second common-to-white-keys base end 21 or 22. The hinges 24 and the first common-to-white-keys base end 21, and the hinges 25 and the second common-to-white-keys base end 22 are the same in thickness and extend vertically and perpendicular to the key depression surfaces 27*a* and parallel to the key arrangement direction.

In assembling the first and second white key units WU1, WU2 and the black key unit BU into the key unit UNT, the first and second common-to-white-keys base ends 21, 22 and the common-to-black-keys base end 23, which are common base ends of the units WU1, WU2 and BU, are sequentially disposed in a stacked relation from the front side of the keyboard instrument, as shown in FIG. 4. The common base ends 21 to 23 are made in contact with one another and stacked together to form the above described common-to-all-keys base end 20.

When any of the key depression switches 12, 13 is depressed or released by a corresponding one of the white and black key main bodies 27 and 28, a key depression/release operation is detected. Based on the detected key depression/release operation, a musical tone is generated by a tone generating section, not shown.

As shown in FIG. 2B, the key frame 10 is integrally formed at its rear portion 10*a* with elastic members 17 so as to project therefrom in the key arrangement direction at a plurality of locations (for example, three locations) on the front side of the rear portion 10*a* with respect to the recessed groove 15. The elastic members 17 are formed so as to extend upward and formed thin along the key arrangement direction in such a manner that upper ends of the elastic members can be deformed in the front-to-back direction. The elastic members 17 are each integrally formed at a rear surface thereof with a protrusion 17*a*, which is formed in a circular shape as seen from rear so as to project from the elastic member (refer to FIG. 2B). The key frame 10 is integrally formed with elastic members 16 so as to project therefrom in the key arrangement direction at a plurality of locations (for example, two locations) on the rear side of the rear portion 10*a* with respect to the recessed groove 15. The elastic members 16 each have an upper end thereof that can be deformed in the front-to-back direction.

The key unit UNT is assembled in advance and then mounted to the key frame 10. First, the second common-to-white-keys base end 22 of the second white key unit WU2 is superimposed on the rear surface of the first common-to-white-keys base end 21 of the first white key unit WU1, and the protrusions 21*a* are caused to be fitted into the fitting holes, not shown, of the second common-to-white-keys base end 22. Then, the common-to-black-keys base end 23 of the back key unit BU is superimposed on the rear surface of the second common-to-white-keys base end 22 and is positioned so that the common base ends 21, 22 are held between the temporary joint members 31 disposed on the both sides thereof.

Then, the common-to-all-keys base end 20 of the key unit UNT, which is comprised of the white and black key units stacked in three layers, is fitted to the recessed groove 15 of the key frame 10 from above. As a result, the protrusions 17*a* (see, FIG. 2B) of the elastic member 17 are fitted in the fitting holes, not shown, of the first common-to-white-keys base end 21 and the protrusions 23*a* (see, FIGS. 3 and 4) of the common-to-black-keys base end 23 are fitted into the fitting holes, not shown, of the elastic members 16. At that time, the elastic members 17, 16 having elasticity are once deformed to the front side and the rear side, respectively, and then restored to their original states when they are fitted with the base ends, whereupon the mounting of the key unit UNT to the key frame 10 is completed.

When a key depression operation is performed after assembly of the key unit UNT to the key frame 10, a corresponding one of the white and black key bodies 27, 28 is pivoted downward (in the forward direction of key depression) due to the presence of elasticity of the hinge 24, 25, or 26, and a lower end of the stopper contact member 29 or 30 is brought in contact with the lower limit stopper 11, whereby a key depression completed state is reached. When a key depression is released, the white or black key main body 27 or 28 is pivoted upward (in the reverse direction from key depression) due to the presence of elasticity of the hinge 24, 25, or 26, and an upper end of a rearwardly extending part of the stopper contact member 29 or 30 is brought in contact with the upper limit stopper 14. Therefore, the white or black key main body 27 or 28 is restored to its key depression initial position.

The rear stopper 42 (see FIGS. 1 and 2B) is formed by an elastic member with shock-absorbing property, such as felt. There may be provided rear stoppers respectively corresponding to the white and black key main bodies 27, 28. Alternatively, a rear stopper may be provided commonly to the key main bodies 27, 28. In this embodiment, when the white and black key main bodies 27, 28 are in the key depression initial position, the contact portions 29*a*, 30*a* which are rear edges of vertically intermediate portions of the stopper contact members 29, 30 (see FIG. 1) are in light contact with front surface of the rear stopper 42. The stopper contact members 29, 30 are loosely fitted into the notches 10*d*, and cannot be in direct contact with the key frame 10 during the entire key depression stroke.

Since the hinges 24 to 26 extend downward at positions below the key depression surfaces 27*a*, 28*a* and the common base ends 21 to 23 are positioned below the key depression surfaces 27*a*, 28*a*, it is possible to attain much proper loci of the key depression surfaces 27*a*, 28*a* at the time of key depression as compared to a hinge arrangement in which hinges extend upward and an ordinary horizontal hinge arrangement. Specifically, at the time of key depression, an arbitrary point on the key depression surface 27*a* or 28*a* (hereinafter referred to as "the key depression point") ordinarily performs a pivotal motion on a circle centered on a pivotal fulcrum. Thus, considering a motion in the front-to-rear direction, the key depression point moves rearward with the advancement of key depression.

In the case of hinge-type keys, the key depression point is displaced also by hinge deformation. For example, in the case of a horizontal hinge, the key depression point is additionally displaced rearward when a front portion of the hinge is deformed downward. Also in an arrangement having upwardly extending hinges, a rearward displacement of the key depression point is caused when a lower portion of a hinge is deformed rearward. From the viewpoint of music performance, it is preferable that the rearward displacement of the key depression point be made small.

In this embodiment, an upper portion of the hinge 24, 25, or 26 is deformed forward at the time of key depression, and therefore, such deformation of the hinge 24, 25, or 26 acts to cancel a rearward displacement of the key depression point caused by a pivotal motion of the key depression point about pivotal fulcrum. More specifically, in this embodiment, the key depression point is gradually displaced forward in the front-to-rear direction during the forward stroke of key depression. Therefore, the contact portions 29*a*, 30*a* of the stopper contact members 29, 30 are displaced forwardly together with the white and black key main bodies 27, 28.

As a result, the distance in the front-to-rear direction between the front surface of the rear stopper 42 and the contact portions 29*a*, 30*a* is made minimum or zero at the key depression initial position. As the white or black main body 27 or 28 is pivoted in the forward direction of key depression, the just-mentioned distance gradually increases and is made maximum at the key depression end position. With the above described hinge construction, a substantial locus of the key depression point is made close to a locus of the key depression point in the case of an acoustic grand piano key, which is elongated and pivoted about a fulcrum provided at a lower portion of the key. Accordingly, proper loci of the key depression surfaces 27*a*, 28*a* can be attained, which contributes to improvement in expression.

Since upper ends of the hinges 24 to 26 can be deformed in the front-to-rear direction, the white and black key main bodies 27, 28 can be deformed in the front-to-rear direction with the aid of deformation of the hinges 24 to 26. If no countermeasure is taken, the key main bodies 27, 28 can easily be displaced rearward when a rearwardly acting force is manually applied, and therefore, an excessive force is likely to be applied to the hinges 24 to 26.

In this embodiment, however, in a key-nondepressed state, the contact portions 29*a*, 30*a* are made in contact with the rear stopper 42. When a rearwardly exerting force is applied to any of the key main bodies 27, 28, a forwardly exerting force is applied from the rear stopper 42 to the contact portion 29*a* or 30*a* concerned, whereby a rearward displacement of the key main body 27 or 28, which is in a key-nondepressed state, is suppressed. Thus, the deformation of the corresponding hinge 24, 25, or 26 is made small and plastic deformation of the hinge is prevented. On the other hand, except for at the key depression initial position, the contact portions 29*a*, 30 are separated away from the rear stopper 42 (see, the stopper contact members 29, 30 shown by two-dotted chain line in FIG. 1). In the key depression/release stroke, therefore, the key main bodies 27 and 28 are capable of being pivoted without any difficulty.

From the viewpoint of preventing plastic deformation of the hinges 24 to 26, the contact portions 29*a*, 30*a* in the key depression initial position may not be in complete contact with the rear stopper 42. In other words, each of the stopper contact members may be configured so that the contact portion thereof is disposed close to the rear stopper with a slight gap (preferably as small as possible) therebetween for contact with the rear stopper when the corresponding key main body 27 or 28 is urged rearward. Since the rear stopper 42 has elasticity, each of the contact portions 29*a*, 30*a* may be designed for light contact with the rear stopper 42 when the concerned key is in the key depression initial position. In the assembled keyboard structure, there may be a gap between the contact portions and the rear stopper. Occurrence of such a gap due to secular change is also acceptable. Needless say, rearward displacements of the key main bodies 27, 28 become smaller when the gap is made smaller or zero.

In the course of the key depression/release stroke, the contact portion 29*a* or 30*a* is separated from the rear stopper 42, but a gap therebetween does not increase to a large extent. As a result, when the key main body 27 or 28 is urged rearward by an excessively large force, the contact portion 29*a* or 30*a* is made in contact with the rear stopper 42, whereby the worst case that the hinge 24, 25, or 26 is plastic-deformed during the key depression/release operation can be prevented.

According to this embodiment, the hinges 24 to 26 are extended in the key unit UNT in the direction perpendicular to the key depression surfaces 27*a* and parallel to the vertical direction and the key arrangement direction. Therefore, the dimension of the key unit UNT in the key longitudinal direction can be reduced, making it possible to suppress the depth dimension of the keyboard instrument.

In a key-nondepressed state, the contact portions 29*a*, 30*a* are in contact with the rear stopper 42. This contacting arrangement makes it possible to suppress rearward displacements of the key main bodies 27, 28 even when they are urged rearwardly, thereby preventing plastic deformation of the hinges 24 to 26.

When any of the key main bodies 27 and 28 is forwardly pivoted in a key depression stroke, a corresponding contact portion 29*a* or 30*a* is displaced forwardly in the front-to-rear direction together with the pivoted key main body 27 or 28. As a result, there increases the distance between the rear stopper 42 and the contact portion 29*a* or 30*a* in the front-to-rear direction, which makes it possible to set the distance between the rear stopper 42 and the contact portions 29*a*, 30*a* to a minimum (zero in this embodiment), without hindering the key depression operation. As a consequence, much preferable loci of the key depression points can be realized, and rearward displacements of the key main bodies 27 and 28 in a key-nondepressed state can be suppressed to a minimum without hindering the key depression operation, thereby effectively preventing plastic deformation of the hinges 24 to 26.

It should be noted that in order to solely prevent the key depression operation from being hindered while suppressing rearward displacements of the key main bodies 27 and 28 in a key-nondepressed state, the stopper contact members may be configured that the contact portions 29*a*, 30*a* are separated away from the rear stopper 42 when they are in a position other than the key depression initial position. Even with an arrangement in which the key main bodies are not displaced forwardly in the forward stroke of key depression, it is possible by well designing the shapes of the rear stopper and the contact portions to arrange the contact portions 29*a*, 30*a* closest to the rear stopper 42 when the keys are in a key-nondepressed state. An example is shown in FIG. 5, and an illustrated concept can be applied to arrangements according to a second embodiment and subsequent embodiments, which will be described below.

Figure 5:
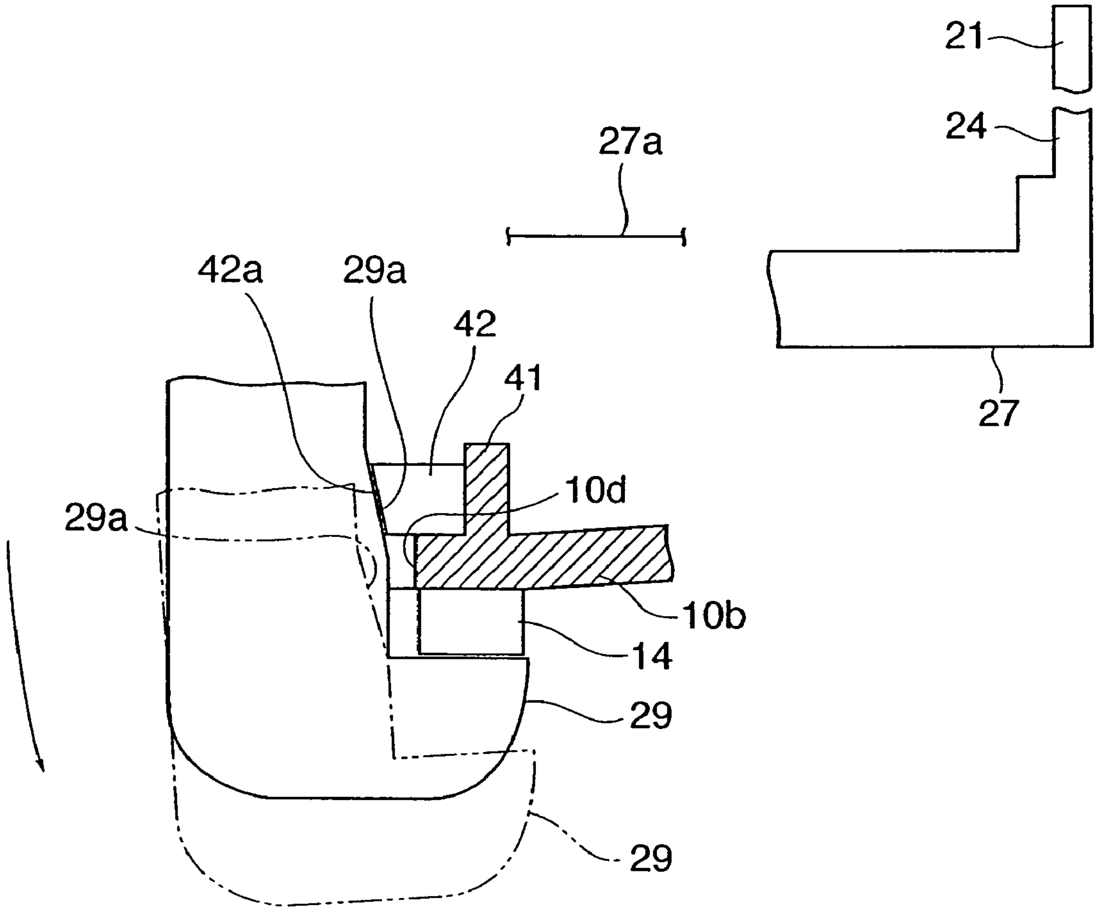
FIG. 5 is a side view showing essential parts of a rear stopper and a contact portion according to a modification of the first embodiment.

FIG. 5 is a side view showing essential parts of a rear stopper and a contact portion according to a modification of the first embodiment. FIG. 5 shows by way of example an arrangement in which the shape of the rear stopper 42 and the shape of the contact portion 29*a* of the stopper contact member 29 of the white key main body 27-1 are modified. This modification can also be applied to the white key main body 27-2 and the black key main body 28.

In the arrangement shown in FIG. 1, the front surface of the rear stopper 42 and the rear surface of the contact portion 29*a* of the stopper contact member 29 are formed to extend parallel to the vertical direction. On the other hand, in this modification, the front surface 42*a* of the rear stopper 42 is formed so as to be forwardly inclined toward upward and the contact portion 29*a* is correspondingly formed to be forwardly inclined toward upward, so that the rear stopper and the contact portion are in face contact with each other in a key-nondepressed state, as shown in FIG. 5. Such an inclined arrangement can also be adopted in the first embodiment.

In this modification, as shown in FIG. 5, the hinge 24 is not extended downward but upward from a rear end of the white key main body 27-1, and the common base end 21 is positioned above the key depression surface 27*a*. When considering a movement in the front-to-rear direction, the key depression point on the key depression surface 27*a* moves rearward with advancement of key depression (refer to a two-dotted chain line in FIG. 5). With such a construction, it is possible to dispose the contact portion 29*a* of the stopper contact member 29 close to or in contact with the front surface 42*a* of the rear stopper 42 in a key-nondepressed state but separated away therefrom in a key-depressed state by the action of the inclination provided to the front surface of the stopper and the contact portion of the contact member.

In the first embodiment, rearward displacements of the key main bodies 27, 28 are restricted by the contact between the rear stopper 42 and the contact portions 29*a*, 30*a* of the stopper contact members 29, 30. Also in the second to sixth embodiments described below, there are used paired members adapted for contact with each other to restrict rearward displacements of the key main bodies 27, 28. However, these paired members are different from those of the first embodiment.

Second Embodiment

Figure 6:
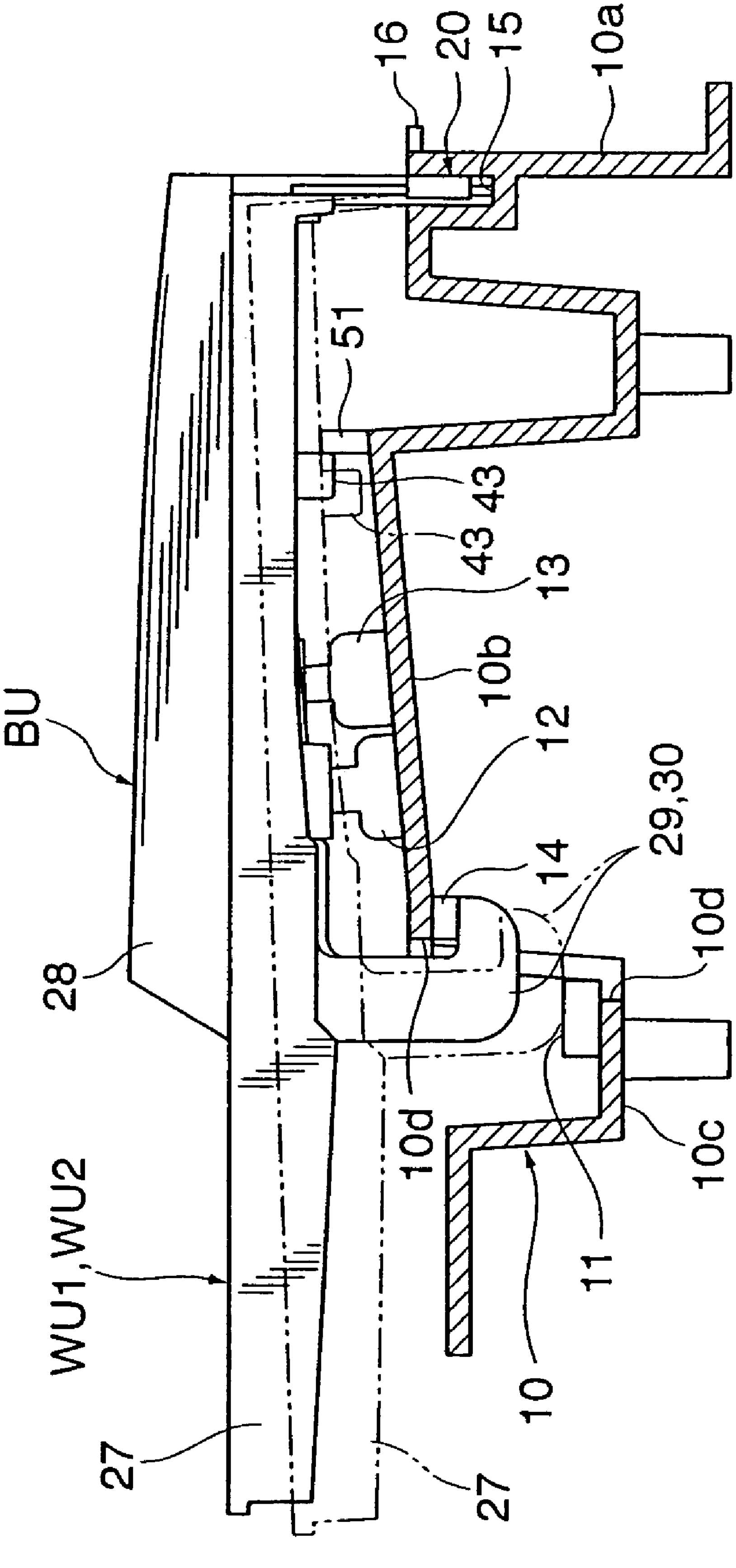
FIG. 6 is a sectional view showing an essential part of an electronic keyboard instrument to which is applied a keyboard structure according to a second embodiment of the present invention.

FIG. 6 is a sectional view showing an essential part of an electronic keyboard instrument to which is applied a keyboard structure according to a second embodiment of the present invention. This embodiment only differs from the first embodiment in that a rear stopper 51 is provided instead of the above described ridge-like protrusion 41 and the rear stopper 42 which are eliminated in this embodiment and in that the key main bodies 27 and 28 are each provided with a contact portion 43. Other constructions of this embodiment are the same as the first embodiment.

The rear stopper 51 is made of the same or similar material to that of the rear stopper 42, and is fixedly provided, by for example being fixed, on an upper rear part of the intermediate portion 10*a* of the frame 10. The contact portion 43 of each key main body 27 or 28 is formed integrally with a lower surface of the key main body 27 or 28 so as to protrude therefrom. In a key-nondepressed state, a rear part of the contact portion 43 is in light contact with a front surface of the rear stopper 51. In a forward stroke of key depression, the contact portion 43 is separated from the rear stopper 51 with pivotal motion of the corresponding key main body 27 or 28 (refer to a two-dotted chain line in FIG. 6).

This embodiment can achieve the same or similar effects as the first embodiment.

Third Embodiment

Figure 7A:
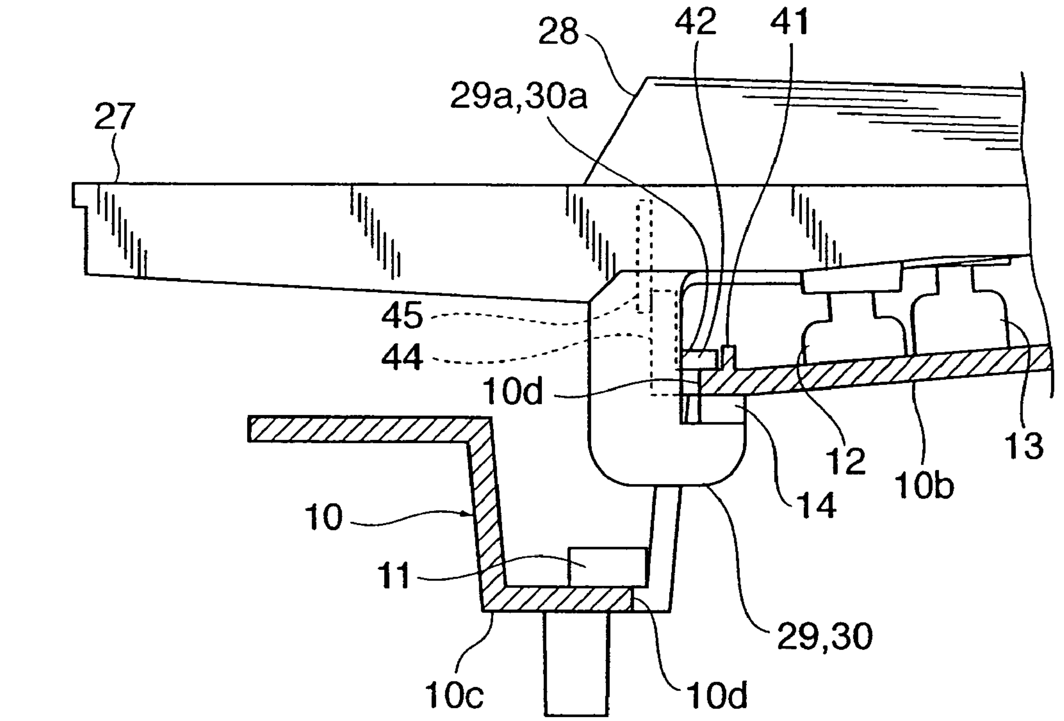
FIG. 7A is a sectional view showing an essential part of an electronic keyboard instrument to which is applied a keyboard structure according to a third embodiment of the present invention.

FIG. 7A is a sectional view showing an essential part of an electronic keyboard instrument to which is applied a keyboard structure according to a third embodiment of the present invention. This embodiment only differs from the first embodiment in that key guides 44 and contact portions 45 are provided, with the other constructions being the same as or similar to the first embodiment.

The key guides 44 are integrally formed in those portions of the key frame 10 which are in the vicinity of the notches 10*d* of the key frame 10 on the front side of the notches 10*d*, so as to extend upward. The key guides 44 are each slidably fitted between a corresponding pair of stopper contact members 29, 30. The contact portions 45 are integrally formed in the key main bodies 27, 28. Between a corresponding pair of stopper contact members 29, 30 as viewed in the key arrangement direction, each contact portion 45 is formed into a rib shape extending parallel to the vertical direction and the key arrangement direction from an upper portion of the corresponding key main body 27 or 28 to root portions of the corresponding stopper contact members 29, 30.

In the key depression/release stroke, a pair of stopper contact members 29, 30 slidably move relative to the corresponding key guide 44 to thereby guide a pivotal motion of the corresponding key main body 27 or 28. In a key-nondepressed state, a rear part of the contact portion 45 is in light contact with a front surface of the key guide 44. In a forward stroke of key depression, the contact portion 45 is gradually separated from the key guide 44 with a pivotal motion of the key main body 27 or 28. In a pivotal stroke of the key main body 27 or 28, the same relation as with the first embodiment is found between the rear stopper 42 and the contact portion 29*a* or 30*a*. Thus, in a key-nondepressed state, the key guide 44, the contact portion 45, the rear stopper 42 and the contact portion 29*a* or 30*a* cooperate to restrict rearward displacements of the key main bodies 27 and 28.

With this embodiment, the same or similar effects as the first embodiment can be attained, and further rearward displacements of the key main bodies 27, 28 can more stably be restricted by the contact between two sets of the paired members at the two locations.

It should be noted that rearward displacements of the key main bodies 27, 28 may be restricted only by the contact between the key guide 44 and the contact portion 45, with the rear stopper 42 eliminated. Even with such an arrangement, the key guide 44 has both the function of guiding key depressing operation and the function of restricting rearward displacements of the key main bodies 27 and 28.

Fourth Embodiment

Figure 7B:
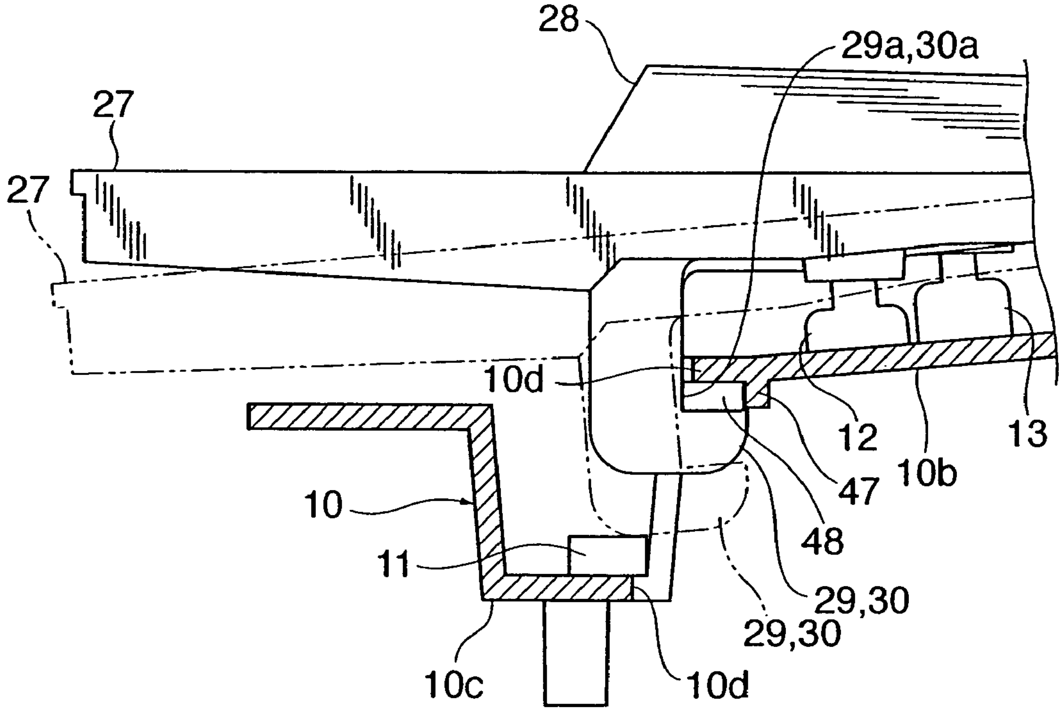
FIG. 7B is a sectional view showing an essential part of an electronic keyboard instrument to which is applied a keyboard structure according to a fourth embodiment of the present invention.

FIG. 7B is a sectional view showing an essential part of an electronic keyboard instrument to which is applied a keyboard structure according to a fourth embodiment of the present invention. This embodiment differs from the first embodiment only in that the ridge-like protrusion 41 and the rear stopper 42 are eliminated and instead a ridge-like protrusion 47 is provided, and in that instead of the upper stopper 14 there is provided an upper limit/rear stopper 48 made of the same material. In other respects, this embodiment is the same in construction as the first embodiment.

The ridge-like protrusion 47 is integrally formed in a front lower part of the intermediate portion 10*b* of the key frame 10 so as to extend in the key arrangement direction. The upper limit/rear stopper 48 is fixedly provided, for example by fixing, in the lower front part of the intermediate portion 10*b* for contact with a front surface of the ridge-like protrusion 47.

As with the upper stopper 14, the upper limit/rear stopper 48 acts to restrict the key depression initial position of the key main bodies 27 and 28. In addition, the upper limit/rear stopper 48 has the function of the rear stopper 42. Specifically, in a key-nondepressed state, rear parts of the contact portions 29*a*, 30*a* are in light contact with the front surface of the upper limit/rear stopper 48. In a forward stroke of key depression, with a pivotal motion of the key main body 27 or 28, the contact portion 29*a* or 30*a* is separated from the upper limit/rear stopper 48 (refer to a two-dotted chain line in FIG. 7B).

This embodiment can attain the same or similar effects attained by the first embodiment. Furthermore, the upper limit/rear stopper 48 have both the function of the key depression initial stopper and the function of restricting rearward displacements of the key main bodies 27 and 28, making it possible to avoid a complicated structure.

Fifth Embodiment

Figure 8A:
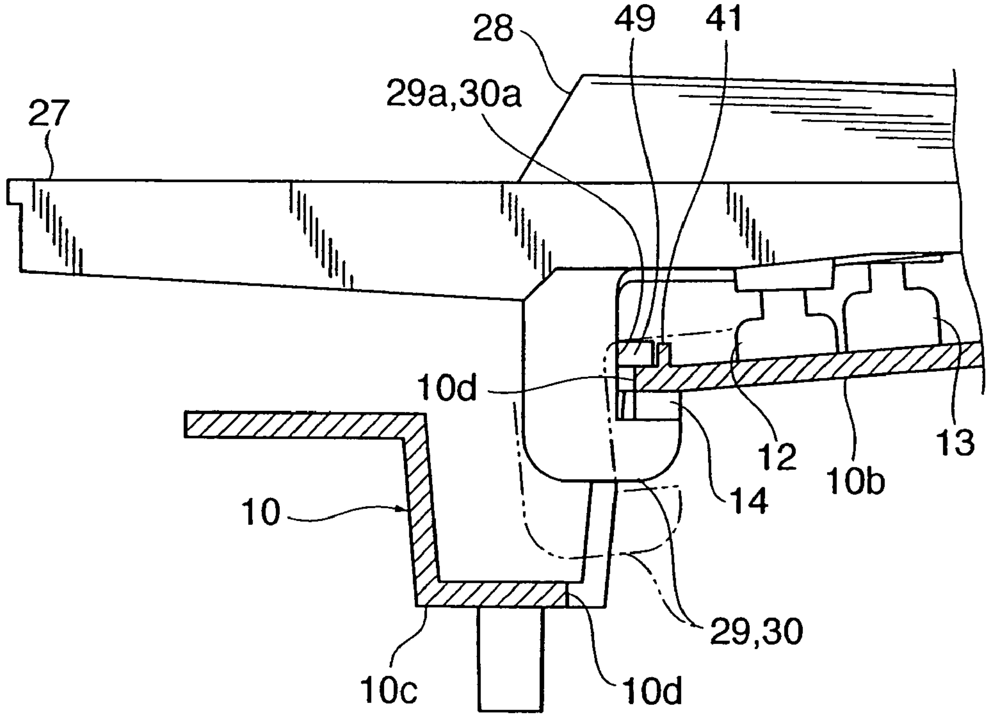
FIG. 8A is a sectional view showing an essential part of an electronic keyboard instrument to which is applied a keyboard structure according to a fifth embodiment of the present invention.

FIG. 8A is a sectional view showing an essential part of an electronic keyboard instrument to which is applied a keyboard structure according to a fifth embodiment of the present invention. This embodiment differs from the first embodiment only in that the lower stopper 11 is eliminated and in that instead of the rear stopper 42 a lower limit/rear stopper 49 is provided that is made of the same material as the rear stopper 42. The other constructions of this embodiment are the same as the first embodiment.

The lower limit/rear stopper 49 is fixedly provided, by for example fixing, at an upper front part of the intermediate portion 10*b* for contact with a front surface of the ridge-like protrusion 41, and has a larger height than the rear stopper 42. The lower limit/rear stopper 49 is adapted for contact with lower surfaces of forwardly pivoted key main bodies 27, 28, thereby restricting, as with the lower stopper 11, the key depression end positions of the key main bodies 27 and 28. Further, the lower limit/rear stopper 49 has the function of the rear stopper 42.

Specifically, in a key-nondepressed state, rear parts of the contact portions 29*a*, 30*a* are in light contact with a front surface of the lower limit/rear stopper 49. In a forward stroke of key depression, with a pivotal motion of the key main body 27 or 28, the corresponding contact portion 29*a* or 30*a* is separated from the lower limit/rear stopper 49.

This embodiment can achieve the same effects as the first embodiment. In addition, this embodiment includes the lower limit/rear stopper 49 having both the function of a key depression stopper and the function of restricting rearward displacements of the key main bodies 27 and 28, making it possible to avoid the construction from being complicated.

Six Embodiment

In the first to fifth embodiments, the key frame 10 is provided with an element adapted for substantial contact with the key main bodies 27, 28 to thereby restrict rearward displacements of the key main bodies 27, 28, but this is not limitative. Such an element is only required to be fixedly provided directly or indirectly to the instrument body.

Figure 8B:
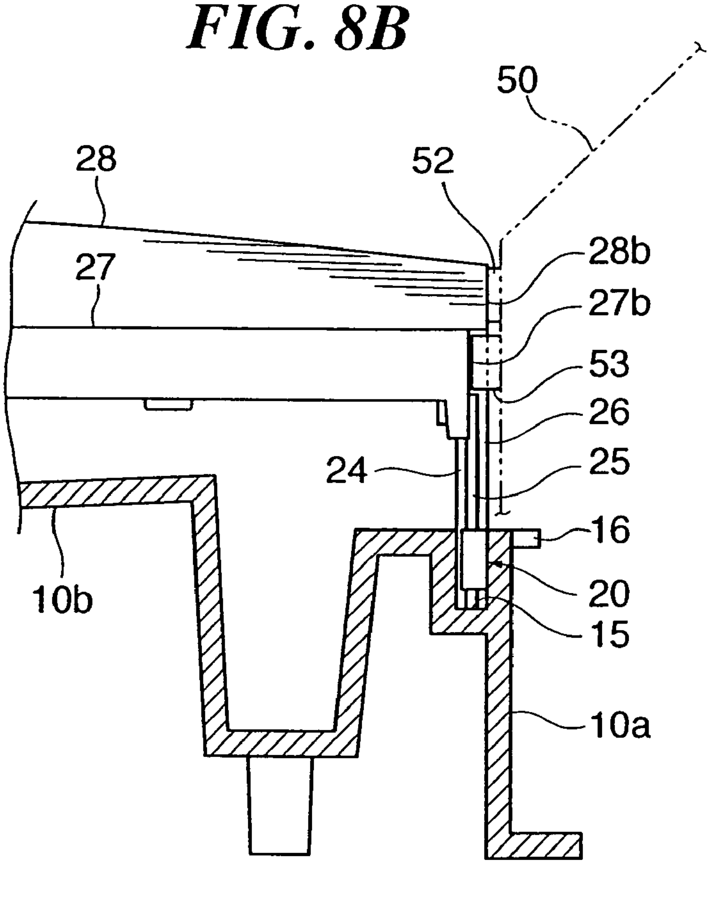
FIG. 8B is a sectional view showing an essential part of an electronic keyboard instrument to which is applied a keyboard structure according to a sixth embodiment of the present invention.

FIG. 8B is a sectional view showing a rear portion of a key of an electronic keyboard instrument to which is applied a keyboard structure according to a sixth embodiment of the present invention. This embodiment differs from the first embodiment only in that the ridge-like protrusion 41 and the rear stopper 42 are removed, and rear stoppers 52, 53 are provided in a panel 50 which is a part of the instrument body. This embodiment is the same or similar to the first embodiment in other constructions.

The rear stoppers 52, 53 are made of the same material as the rear stopper 42, and are fixedly provided by for example fixing to the panel 50 in a gap between the panel 50 and rear end surfaces 27*b*, 28*b* of the key main bodies 27, 28. In a key-nondepressed state, the rear end surfaces 27*b*, 28*b* of the white and black key main bodies 27, 28 are in light contact with front surfaces of the rear stoppers 52, 53. In a forward stroke of key depression, with a pivotal motion of the key main body 27 or 28 concerned, the rear end surface 27*b* or 28*b* of the key main body 27 or 28 is separated from the rear stoppers 52, 53.

This embodiment can achieve the same or similar effects as the first embodiment.

It should be noted that from the viewpoint of suppressing rearward displacements of the key main bodies 27, 28 in a key-nondepressed state, an arrangement is not limited to the examples in the above described embodiments. In brief, it is only required that an element such as the rear stopper 42 adapted for contact with the contact portions 29*a*, 30*a* fixed to the key main bodies 27, 28 be fixedly provided to at least one of the key frame 10 and the instrument body. From the viewpoint of stably suppressing rearward displacements of the key main bodies 27, 28, it is preferable that elements such as the contact portions 29*a*, 30*a* and the rear stopper 42 be disposed close to the key main bodies 27, 28 as viewed in the vertical direction. For example, as shown in the above described embodiments, these elements are preferably disposed at the same positions as upper ends of the common base ends 21 to 23 serving as key fulcrums or at positions closer to (above) the key main bodies 27 and 28 than to the upper ends of the common base ends.

Furthermore, among various paired elements adapted for contact with each other as described in the embodiments, the keyboard structure may be provided with two or more sets of paired elements. For example, there may be included both the combination of the contact portions 29*a*, 30*a* and the rear stopper 42 (shown in the first embodiment in FIG. 1) and the combination of the rear end surfaces 27*b*, 28*b* and the rear stoppers 52, 53 (shown in the sixth embodiment in FIG. 8B).

It should be noted that the rear stoppers 42, 51, 52, 53, the upper limit/rear stoppers 48, and the lower limit/rear stopper 49 may be provided in each individual key or may be integrally provided in each of one or more predetermined key groups.

It should also be noted that the contact relation between the contact portions 29*a*, 30*a* and the rear stopper 42 or between other paired elements is not limited to a face contact but may be a line contact or a point contact.

In the above described embodiments, the rear stopper 42 and the like are made of felt or the like to have a shock-absorbing property. This is not limitative. Alternatively, a member having a shock-absorbing property may be provided or fixed in those parts of the key main bodies 27, 28 (such as the contact portions 29*a*, 30*a*) which are adapted for contact with the rear stopper 42 or the like. In that case, the rear stopper 42 or the like may be formed integrally with the key frame 10.

In the above described embodiments, the hinges 24 to 26 are extended in the vertical direction. From the viewpoint of suppressing the depth dimension of the keyboard instrument as small as possible and improving the loci of the key depression surfaces 27*a*, 28*a*, it is only required that the hinges be formed so as to extend in a direction to cross the key depression surface 27*a* and parallel to the key arrangement direction. For example, therefore, the hinges may be obliquely inclined downward toward the rear. The common base ends may not be extended parallel to the hinges 24 to 26 and may not be the same in thickness as the hinges. There may be a step difference between the common base ends and the hinges 24 to 26 as viewed in the front-to-rear direction.

In the above described embodiments, there have been described arrangements that suppress rearward displacements of the key main bodies 27, 28 in a key-nondepressed state. There may additionally be provided an arrangement that is reversed in construction to the described arrangements as viewed in the front-to-rear direction and adapted to suppress forward displacements of the key main bodies. In that case, a contact portion may be formed into a shape reversed in the front-to-rear direction to that of the example shown in FIG. 5 so as to be adapted for contact with a stopper only in a key-nondepressed state.

It should be noted that in the illustrated examples the keys are unified into a part of the key unit UNT. However, the present invention is also applicable to a keyboard instrument having individual keys.

It should also be noted that the present invention is applicable to a keyboard instrument provided with hammers each adapted to be pivoted interlockingly with a corresponding key to thereby add appropriate inertia to the key which is depressed.

What is claimed is:

1. A keyboard structure of an electronic keyboard instrument, comprising:

keys having key main bodies thereof connected through thin plate-like hinges to base ends at a rear of the keys and adapted to be pivoted about the base ends as key fulcrums in a key depression or release direction;

an integral key frame fixedly provided relative to an instrument body and adapted to fixedly support the base ends of said keys, the key frame extending over the width of said keys, and having a recessed groove for receiving said base ends;

a stopper fixedly provided in at least one of the instrument body and said key frame; and stopper contact portions provided in the key main bodies and disposed close to or in contact with said stopper in a key-nondepressed state, wherein said thin plate-like hinges of the keys are formed to extend downward from rear ends of the key main bodies in a direction intersecting key depression surfaces of the key main bodies and said thin plate-like hinges of the keys extend in a direction parallel to a key arrangement direction, and wherein when any of the key main bodies is urged rearward at least in the key-nondepressed state, the stopper contact portion corresponding to the urged key main body is made in contact with said stopper to thereby restrict a rearward displacement of the urged key main body.

2. The keyboard structure according to claim 1, wherein a distance between the stopper and each of the stopper contact portions during a key depression or release stroke is made minimum in the key-nondepressed state.

3. The keyboard structure according to claim 2, wherein the base ends are located below the key depression surfaces of the key main bodies in the key-nondepressed state, and the stopper contact portions are each adapted to be displaced forwardly together with a corresponding one of the key main bodies with a forward pivotal motion of the key main body in a key depression stroke, so that the distance between the stopper and the stopper contact portion in a front-to-rear direction increases with the forward pivotal motion of the key main body during the key depression stroke.

4. The keyboard structure according to claim 1, wherein said stopper is provided in the key frame and formed to have a function of a key guide to guide a key depression or release action of the key main bodies.

5. The keyboard structure, according to claim 1, wherein said stopper is provided in the key frame and formed to have a function of a key depression initial stopper adapted for contact with the key main body reversely pivoted in the key depression stroke to thereby restrict a key depression initial position of the keys.

6. The keyboard structure according to claim 1, wherein the stopper is provided in the key frame and formed to have a function of a key depression end stopper adapted for contact with the key main body forwardly pivoted in the key depression stroke to thereby restrict a key depression end position of the keys.

7. The keyboard structure according to claim 1, wherein said keys comprise an octave, and said key frame extends over the width of said keys of the octave.

* * * * *